(12) United States Patent
Oshimo

(10) Patent No.: US 12,703,271 B2
(45) Date of Patent: Aug. 11, 2026

(54) RECLINING DEVICE

(71) Applicant: DELTA KOGYO CO., LTD., Hiroshima (JP)

(72) Inventor: Hiroki Oshimo, Hiroshima (JP)

(73) Assignee: DELTA KOGYO CO., LTD., Hiroshima (JP)

(*) Notice: Subject to any disclaimer, the term of this patent is extended or adjusted under 35 U.S.C. 154(b) by 279 days.

(21) Appl. No.: 18/555,763

(22) PCT Filed: May 16, 2022

(86) PCT No.: PCT/JP2022/020388
§ 371 (c)(1),
(2) Date: Oct. 17, 2023

(87) PCT Pub. No.: WO2022/244731
PCT Pub. Date: Nov. 24, 2022

(65) Prior Publication Data

US 2024/0208373 A1 Jun. 27, 2024

(30) Foreign Application Priority Data

May 18, 2021 (JP) ................................ 2021-083874

(51) Int. Cl.
*B60N 2/22* (2006.01)

(52) U.S. Cl.
CPC ................................ *B60N 2/2213* (2013.01)

(58) Field of Classification Search
CPC ................................................ B60N 2/2213
See application file for complete search history.

(56) References Cited

U.S. PATENT DOCUMENTS

2011/0012414 A1 1/2011 Yamada et al.
2012/0126603 A1 5/2012 Peters
(Continued)

FOREIGN PATENT DOCUMENTS

DE 10 2009 032 750 A1 1/2011
DE 10 2014 215 116 A1 2/2015
(Continued)

OTHER PUBLICATIONS

International Search Report issued in PCT/JP2022/020388; mailed Jul. 19, 2022.

(Continued)

*Primary Examiner* — David R Dunn
*Assistant Examiner* — Tania Abraham
(74) *Attorney, Agent, or Firm* — Studebaker Brackett PLLC

(57) ABSTRACT

A reclining device includes a guide bracket that is fixedly attached to one of a seat cushion and a seatback, an internal gear that is fixedly attached to the other and is shiftable for relative rotation to the guide bracket, at least a pair of lock gears that are respectively movable along a guide part provided on the guide bracket and includes external teeth meshable with internal teeth of the internal gear, and a cam that shifts the lock gears along the guide part between a lock position at which the relative rotation is regulated and an unlock position to release lock. The external teeth of the lock gear each have a shape including an indentation portion on a tooth surface closer to the guide part in a tooth thickness direction so as to define a gap between the tooth surface closer to the guide part and an internal tooth of the internal gear when the lock gears are in the lock position.

11 Claims, 13 Drawing Sheets

(56) References Cited

U.S. PATENT DOCUMENTS

| | | | | |
|---|---|---|---|---|
| 2013/0113261 | A1 | 5/2013 | Mikasa et al. | |
| 2013/0264850 | A1 | 10/2013 | Maeda | |
| 2014/0225409 | A1 * | 8/2014 | Nagura | B60N 2/236 297/354.1 |
| 2015/0035339 | A1 | 2/2015 | Endou et al. | |
| 2017/0334321 | A1 | 11/2017 | Suzuki et al. | |
| 2018/0149259 | A1 * | 5/2018 | Ito | B60N 2/2213 |

FOREIGN PATENT DOCUMENTS

| | | | |
|---|---|---|---|
| DE | 10 2017 208 629 | A1 | 11/2017 |
| JP | H01-169149 | U | 11/1989 |
| JP | 2002-101993 | A | 4/2002 |
| JP | 2004-105637 | A | 4/2004 |
| JP | 2010-022401 | A | 2/2010 |
| JP | 2012-532062 | A | 12/2012 |
| JP | 2013-100021 | A | 5/2013 |

OTHER PUBLICATIONS

An Office Action issued by the German Patent and Trademark Office on Aug. 27, 2025, which corresponds to German Patent Application No. 112022002629.4 and is related to U.S. Appl. No. 18/555,763; with English language translation.

* cited by examiner 1
2
3
4
5
6
7
8
20
21
22
23
30
32
41
42
43
51
52
61
62
80
81
X
X1
(Sb)
X2
(Sc)

1
2
3
4
5
6
7
8
20
21
24
30
31
41
42
50
51
51a
52
61
62
80
81
X
X1
(Sb)
X2
(Sc)

3
31a
31
41
41a
41b
41a'
(41')
4B(4)
4A(4)
44
40a
22a
Ta
22A(22)

3
41b
①
4B(4)
②
③
31a
22A(22)
④
⑤
①
4A(4)

31
41
41R(41)
31a
41b
S
22A(22)
3
Ar4
Ar3
4B(4)
4A(4)
5
22B(22)
4C(4)
22C(22)
4D(4)
8
22D(22)

31
41N
41b
31a
41
41F(41)
S
3
22A(22)
4B(4)
4A(4)
5
22B(22)
4C(4)
22C(22)
4D(4)
8
22D(22)

RECLINING DEVICE

TECHNICAL FIELD

The present invention relates to a reclining device for adjusting a tilt angle of a seatback with respect to a seat cushion.

BACKGROUND ART

As an example of the reclining device, a reclining device disclosed in Patent Literature 1 is publicly known. This reclining device includes a guide bracket (lower arm) mounted in a seat cushion and an internal gear (upper arm) mounted in a seatback. The guide bracket is provided with a plurality of lock gears (pawls) that include external teeth and are shiftable in a radial direction of the guide bracket. The lock gears mesh with the internal gear from inside, whereby the seatback is held at a predetermined tilt angle with respect to the seat cushion.

Each lock gear is shiftable along a guide part (guide wall) formed on the guide bracket, and is pressed outward in the radial direction by a cam provided at a center of the guide bracket. The cam is rotated by operating a lever to shift the lock gear toward the center of the guide bracket, whereby the interlocking between the lock gear and the internal gear is released. In this state, the tilt angle of the seatback is changed, and the lock gear is meshed again with the internal gear to thereby accomplish the changing of the tilt angle of the seatback.

In the reclining device as described above, a small gap is intentionally secured between the guide part and the lock gear to ensure a smooth shift of the lock gear. However, as the gap allows the internal gear and the lock gear meshed with the internal gear to move integrally in the circumferential direction, this causes the seat back to wobble and generates a contact noise (rattle noise) between the lock gears and the guide part.

In view thereof, in the reclining device of Patent Literature 1, a wedge member is arranged between the lock gear and a guide part on one side of the lock gear such that the cam presses both the wedge member and the lock gear. In other words, in the state that the internal gear meshes with the lock gear, the lock gear is pressed against a guide part on the other side by a wedging effect of the wedge member to thereby prevent the instability of the seatback and the generation of noises due to the instability.

However, this configuration requires the same number of wedge members as that of the lock gears to be mounted on the reclining device, which leads to an increase in the size of the reclining device and in the cost due to the increase in the number of parts and man-hours.

CITATION LIST

Patent Literature

Patent Literature 1: Japanese Unexamined Patent Publication No. 2010-22401

SUMMARY OF INVENTION

The present invention has been made in view of the circumstances described above, and an object thereof is to provide a reclining device that can prevent instability of a seatback and generation of unusual noises without increasing the cost or the size.

A reclining device according to an aspect of the present invention includes a guide bracket that is fixedly attached to one of a seat cushion and a seatback, an internal gear that is fixedly attached to the other of the seat cushion and the seatback and is shiftable for relative rotation to the guide bracket, at least a pair of lock gears that are respectively arranged on both sides of a guide part provided on the guide bracket and movable along the guide part, each lock gear including external teeth meshable with internal teeth of the internal gear, and a cam that shifts the lock gears along the guide part between a lock position at which the internal teeth are meshed with the external teeth to regulate relative rotation and an unlock position to release lock, wherein the external teeth of the pair of lock gears each have a shape including an indentation portion on a tooth surface closer to the guide part in a tooth thickness direction so as to define a gap between the tooth surface closer to the guide part and an internal tooth of the internal gear when the lock gears are in the lock position.

DESCRIPTION OF EMBODIMENTS

Hereinafter, embodiments of the present invention will be described with reference to the accompanying drawings.

Overall Configuration of Reclining Device

Figure 1:
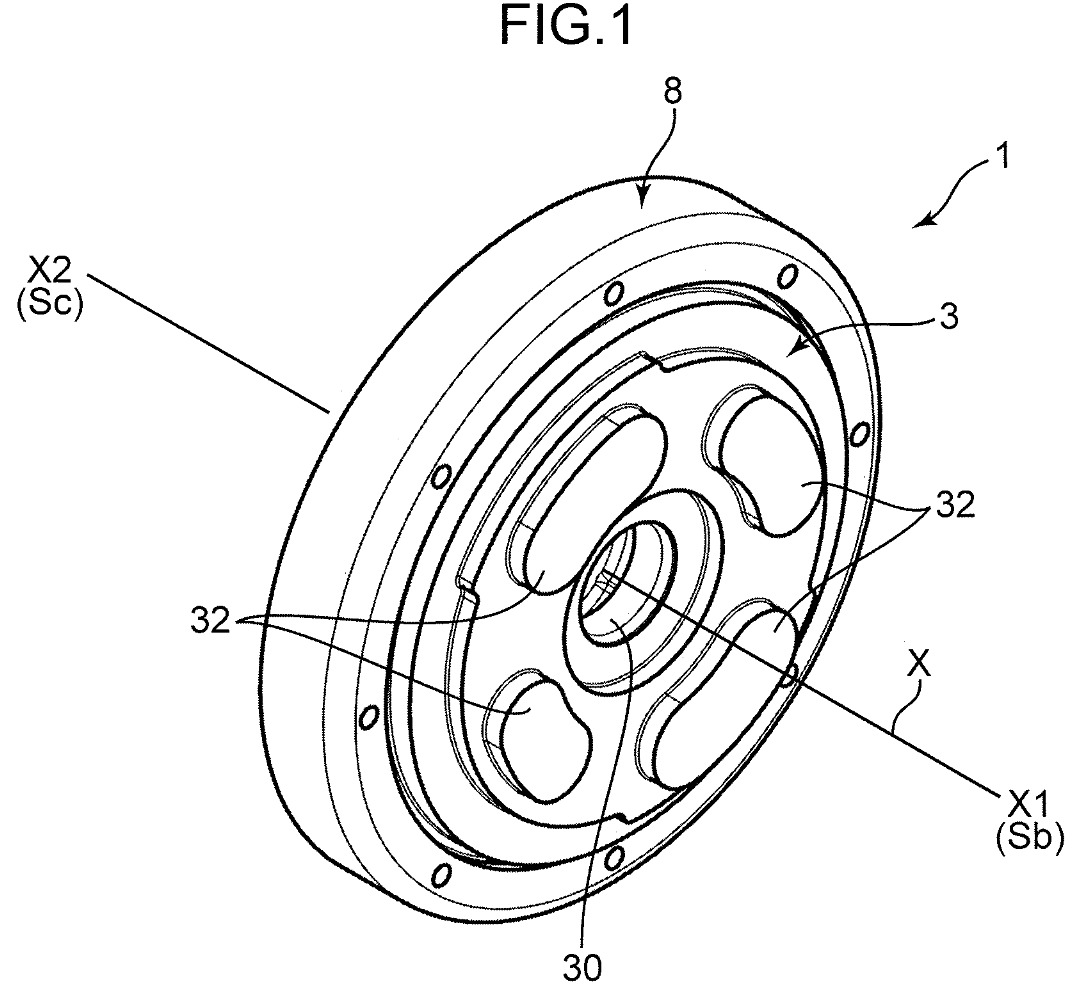
FIG. 1 is a perspective view of a reclining device according to a first embodiment of the present invention.
Figure 2:
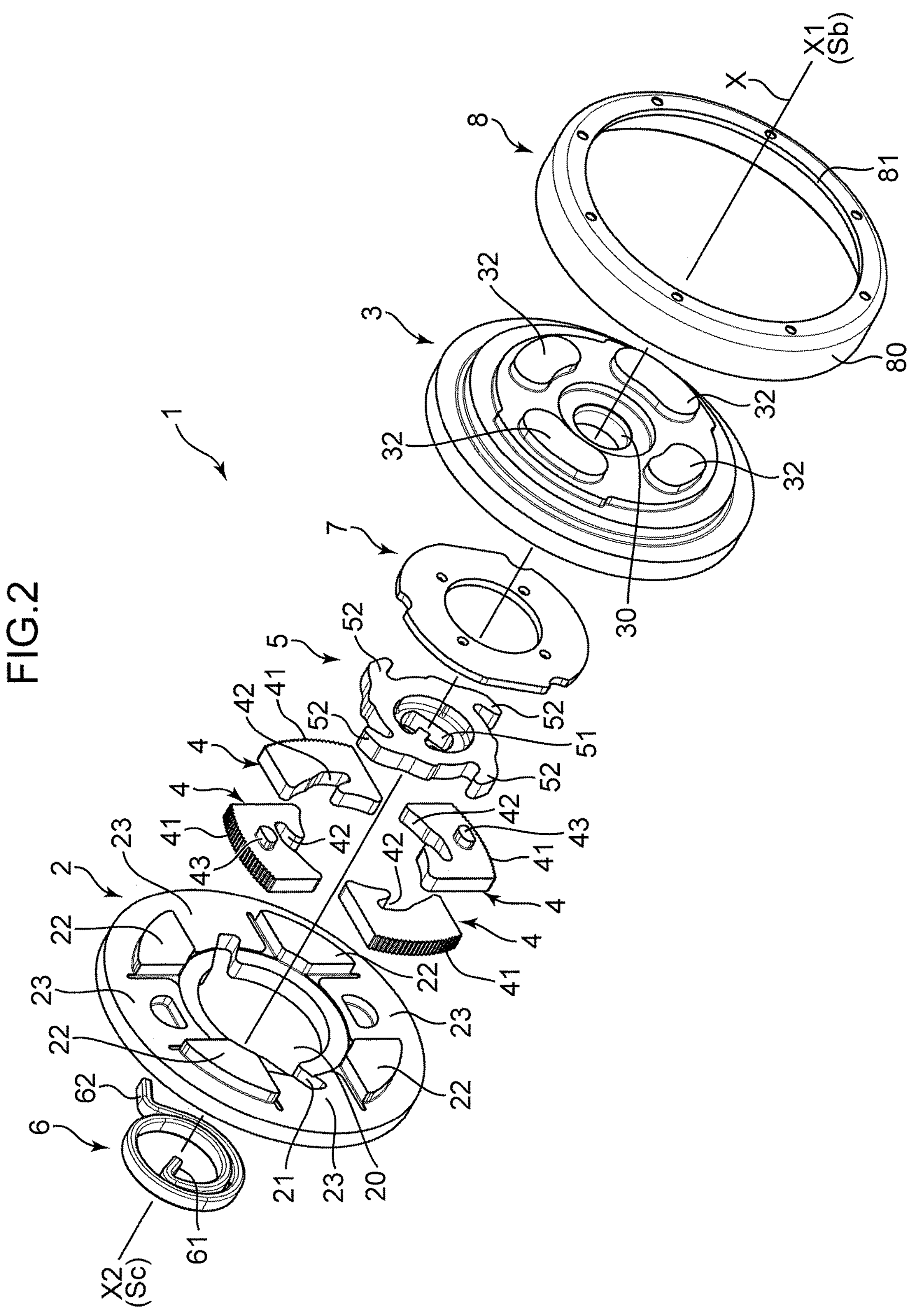
FIG. 2 is an exploded perspective view (from X1 side) of the reclining device.
Figure 3:
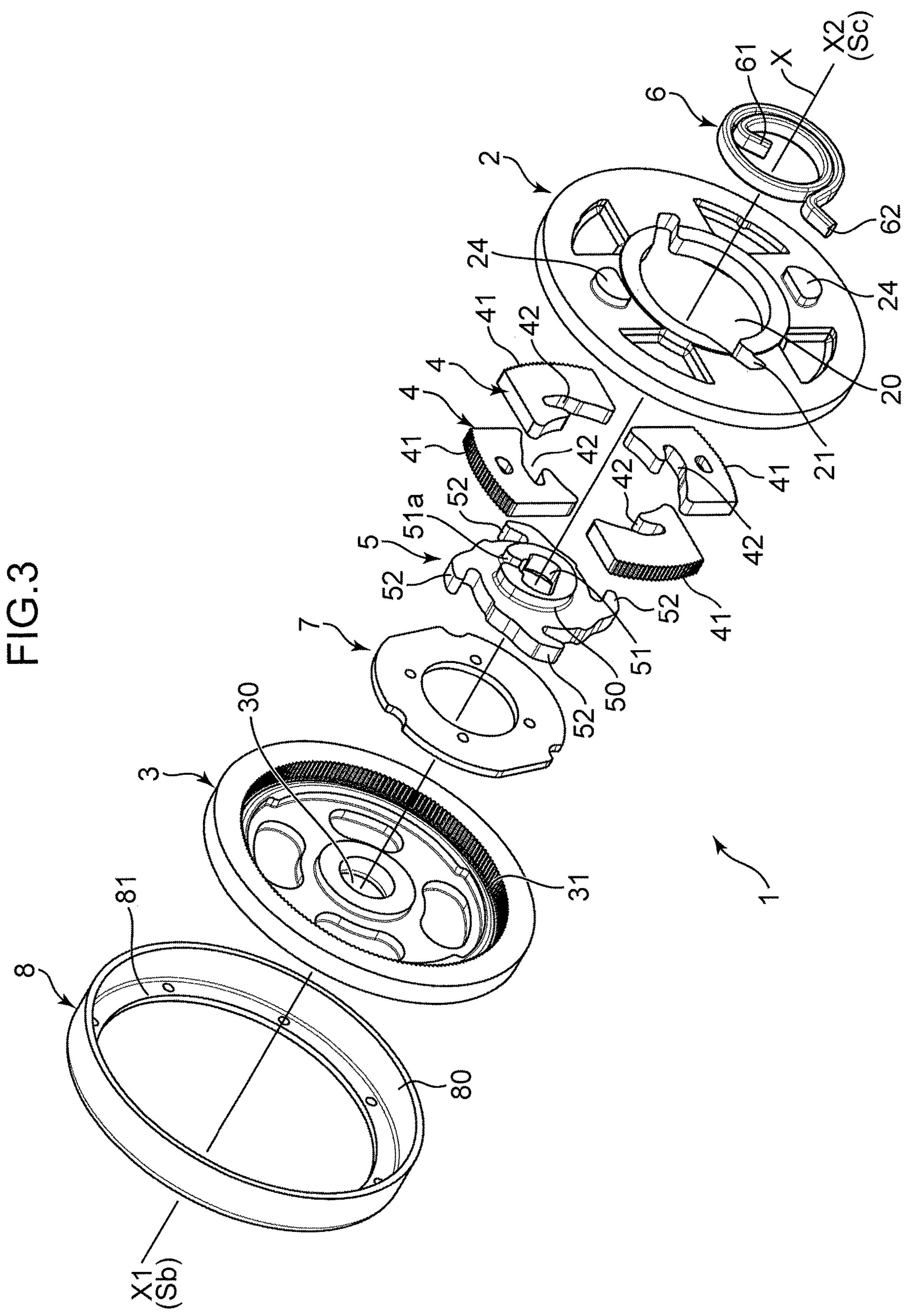
FIG. 3 is an exploded perspective view (from X2 side) of the reclining device.
Figure 4:
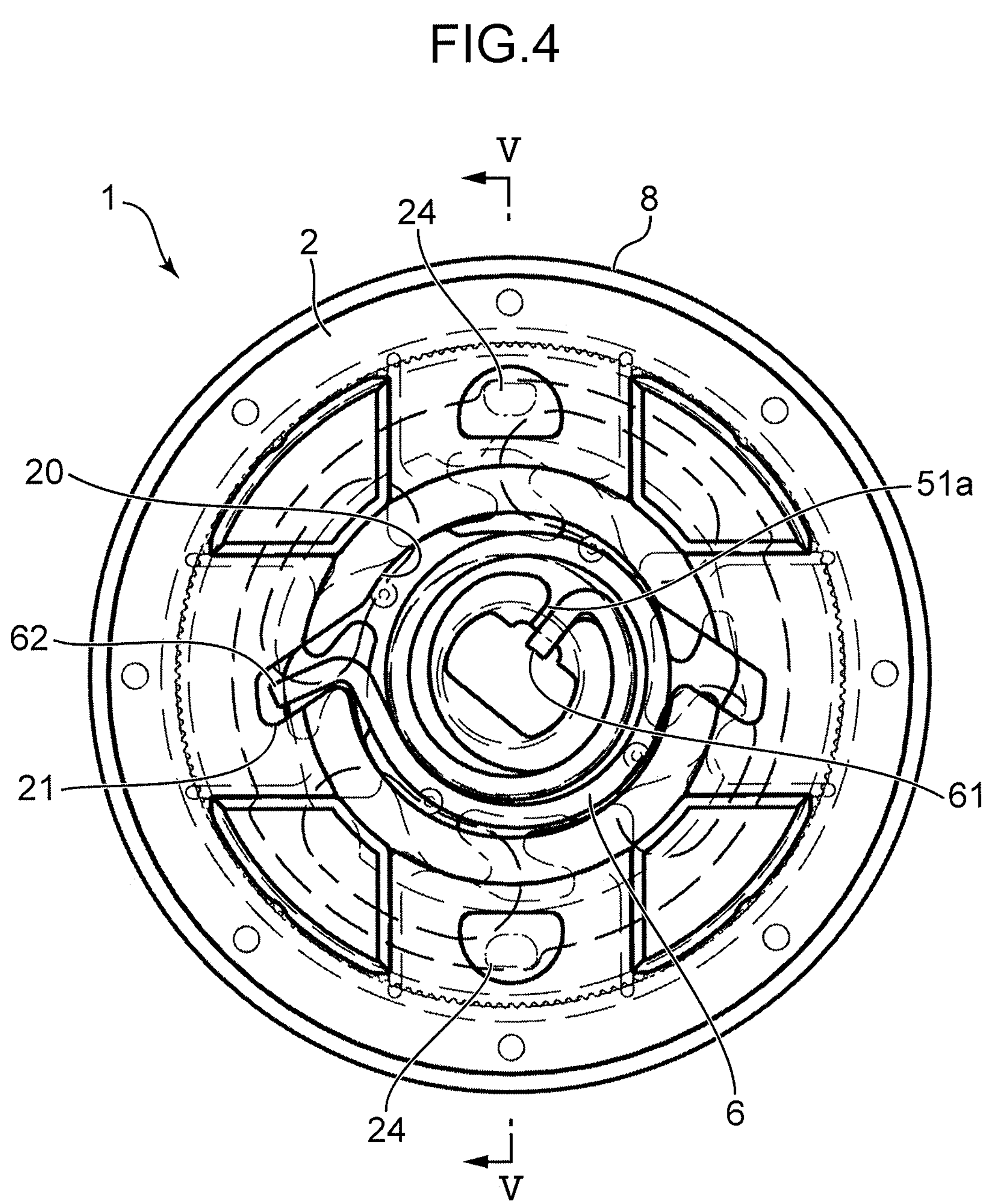
FIG. 4 is a front view (from the X2 side) of the reclining device.
Figure 5:
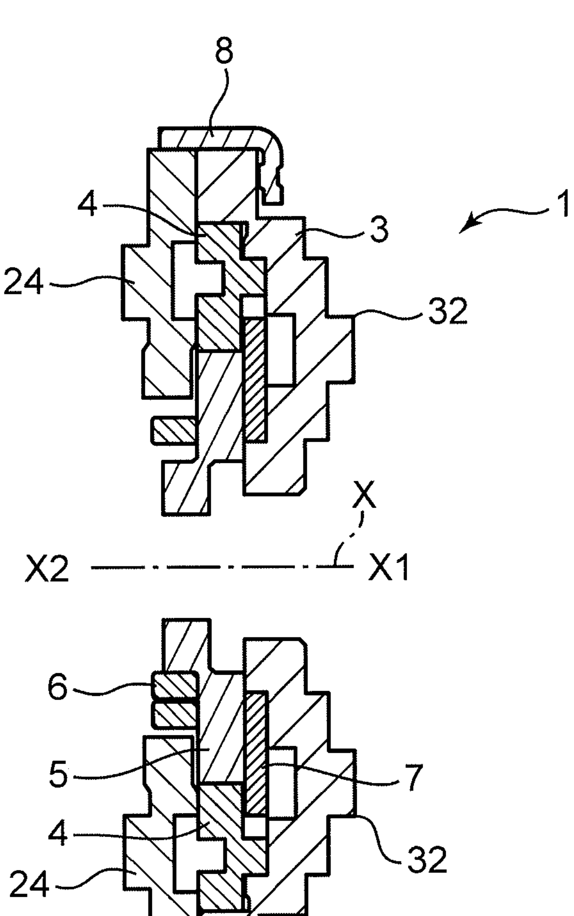
FIG. 5 is a sectional view (taken along a line V-V in FIG. 4) of the reclining device.

FIGS. 1 to 5 show a reclining device 1 according to a first embodiment of the present invention. FIG. 1 is a perspective view. FIGS. 2 and 3 are exploded perspective views. FIG. 4 is a plan view. FIG. 5 is a sectional view. All of these show the reclining device 1.

For example, the reclining device 1 is applied to an unillustrated seat for an automobile. Although not shown, the seat for an automobile is composed of a seat cushion that supports the buttock of an occupant and a seatback that serves as a backrest. The reclining device 1 is the device for use in a seat that is arranged between the seat cushion and the seatback to allow a change in a tilt angle of the seatback with respect to the seat cushion.

In FIG. 1, the reference sign X represents an axis (hereinafter, referred to as X axis) that is a rotational axis of the tilt of the seatback. The reclining device 1 has a shape of a compressed cylinder in a direction of the X axis, and is provided between each of left and right sides of a seat cushion frame and a seat back frame. In this embodiment, in FIG. 1, the X1 side is on the seatback frame (Sb), the X2 side is on the seat cushion frame (Sc).

As shown in FIG. 1 to FIG. 5, the reclining device 1 includes a guide bracket 2 fixedly attached to the seat cushion frame (Sc), an internal gear 3 attached to the seatback frame (Sb), a plurality of (four in this embodiment) lock gears 4 mounted between the guide bracket 2 and the internal gear 3, a rotary cam 5, a lock spring 6, a plate piece 7, and a mounting ring 8 that holds these integrally. As described above, in this embodiment, the guide bracket 2 is fixedly attached to the seat cushion frame (Sc), whereas the internal gear 3 is fixedly attached to the seatback frame (Sb). However, it may be appreciated to adopt a structure in which an internal gear 3 is fixedly attached to the seat cushion frame (Sc) and a guide bracket is fixedly attached to the seatback frame (Sb), that is, an opposite configuration.

The guide bracket 2 is an annular plate member having a substantially circular opening 20 in a center. The guide bracket 2 has a surface on the X1 side formed with four guide parts 22 (referred to as first guide part 22A to fourth guide part 22D in some cases) protruding from the surface in an X1 direction. All the guide parts 22 each have the same fan-shape on the X1 side in a front view. The guide parts 22 are arranged around the opening 20 at an equal interval therebetween to define channels 23 crosswisely extending in radial directions of the guide bracket 2 by the neighboring guide parts 22.

Lock gears 4 (referred to as first lock gear 4A to fourth lock gear 4D in some cases) are respectively placed in the channels 23. The lock gear 4 has a plate-like body including two side surfaces 40*a* in a width direction or in running direction of later-described external teeth 41, the side surface 40*a* extending in parallel to a side surface 22*a* of the guide part 22 (see FIG. 8). The lock gear 4 is slidable along the respective side surfaces 22*a* of the neighboring guide parts 22 in the opposite radial directions of the guide bracket 2. An outer periphery of the lock gear 4, i.e., a portion that is between the neighboring guide parts 22 and corresponds to a radially outer side of the guide bracket 2, is formed into a shape of an arc. This portion is formed with the external teeth 41, which are meshable with later-described internal teeth 31 of the internal gear 3, along the arc. An inner periphery of the lock gear 4 i.e., a portion that corresponds to a radially inner side of the guide bracket 2, is formed with a cam notch 42.

The rotary cam 5 is arranged in a radially inner side of the lock gears 4. The rotary cam 5 has a plate-like body having a substantially swastika shape on the X2 side in a front view and including four cam portions 52 spirally extending from four portions on the outer periphery of the rotary cam 5 in a circumferential direction.

The rotary cam 5 includes a surface on the X2 side having a boss portion 50 around a center thereof. The boss portion 50 has a shaft hole 51 having a rectangular shape at the center. An operation shaft (not shown in the drawing) fixedly attached with an unillustrated operation lever is inserted in the shaft hole 51.

The boss portion 50 of the rotary cam 5 is inserted in the opening 20 of the guide bracket 2. A lock spring 6 that is a spiral spring is fitted between an outer circumferential surface of the boss portion 50 and an inner circumferential surface (an inner surface of the opening 20) of the guide bracket 2. The lock spring 6 has an inner spiral end and an outer spiral end respectively formed with hooks 61 and 62. As shown in FIG. 4, the hook 61 at the inner spiral end is engaged with a notch 51*a* formed in the boss portion 50 of the rotary cam 5, and the hook 62 at the outer spiral end is engaged with a notch 21 formed in the opening 20 of the guide bracket 2. In this configuration, the rotary cam 5 is pushed by a restoring force of the lock spring 6 in a rotational direction around the X axis.

Figure 6:
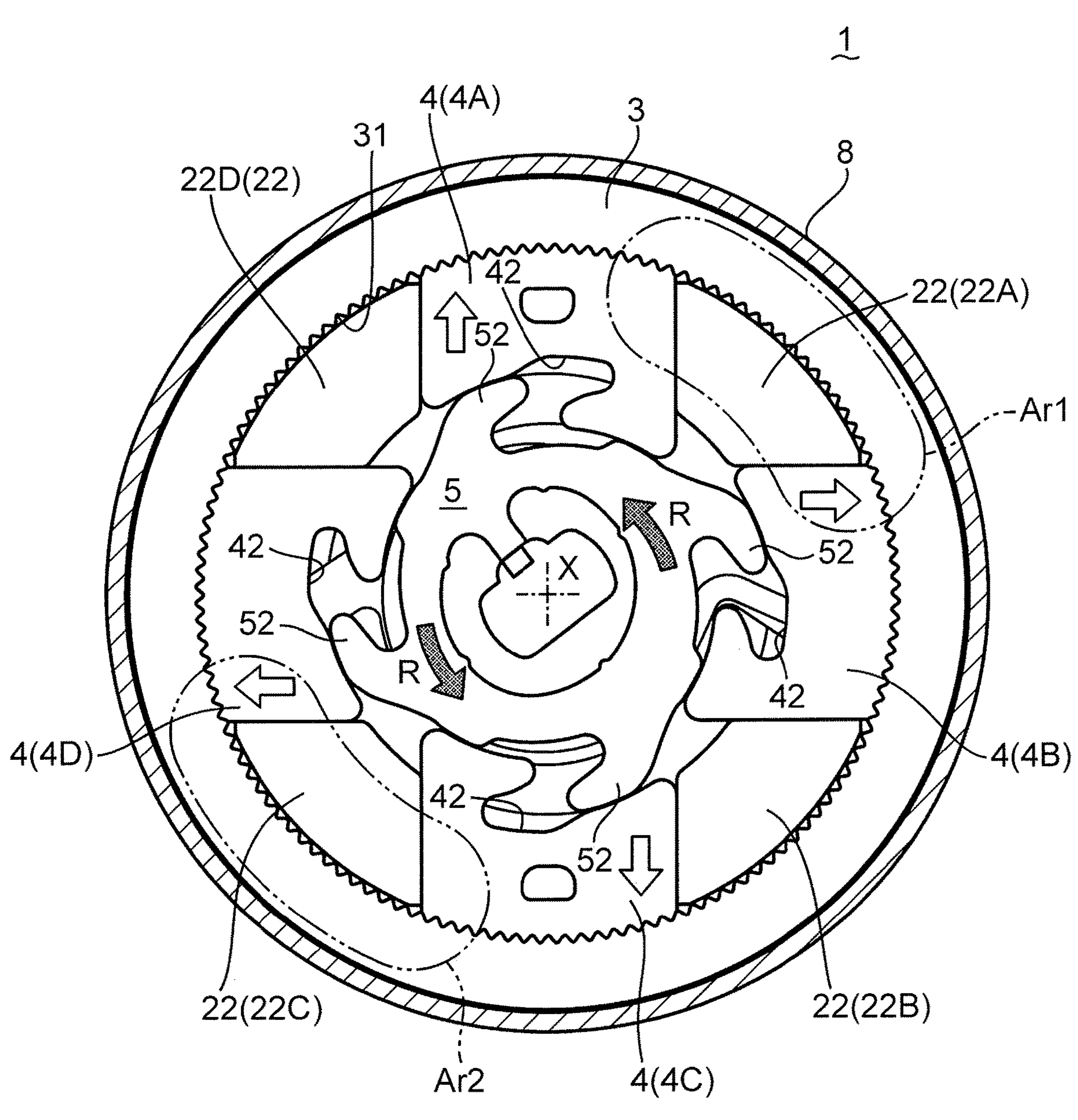
FIG. 6 is a partially sectional view of the reclining device (in a lock state) from the X1 side.

The internal gear 3 has the shape of a cylinder compressed in the direction of the X axis having a bottom and has the same outer diameter as the guide bracket 2. The internal gear 3 has an inner circumferential surface formed with internal teeth 31 meshable with the external teeth 41 of the lock gear 4. As shown in FIG. 5, the internal gear 3 is joined to the guide bracket 2 in a state where the X2 side surface (annular surface) of the internal gear 3 is in contact with the X1 side surface of the guide bracket 2. The guide parts 22 of the guide bracket 2, the lock gears 4, and the rotary cam 5 are arranged inside the internal gear 3 as shown in FIG. 6. FIG. 6 is a partially sectional view of the reclining device 1 (in a later-described lock state) from the X1 side.

The guide bracket 2 and the internal gear 3 are integrally assembled relatively rotatably by the mounting ring 8 in the state that the lock gears 4, the rotary cam 5, the lock spring 6, and the later-described plate piece 7 are arranged inside of them.

Specifically, as shown in FIGS. 2, 3, and 5, the mounting ring 8 includes a cylindrical circumferential surface 80 and an annular flange 81 inwardly extending from a circumferential end of the cylindrical circumferential surface 80. The mounting ring 8 is placed around the guide bracket 2 and the internal gear 3 in such a manner that the X1 side surface of the internal gear 3 abuts the annular flange 81. The cylindrical circumferential surface 80 is fixedly attached to the guide bracket 2 by welding or the like while allowing the internal gear 3 to rotate.

As described above, the lock gear 4 is slidable along the guide parts 22 (side surfaces 22*a*) in the radial direction of the guide bracket 2. This allows the lock gear 4 to shift (advance and retract) between a lock position (position shown in FIG. 6) where the lock gear 4 meshes with the internal gear 3 and an unlock position (position shown in FIG. 7) where the lock gear 4 retracts from the lock position to an inner side of the internal gear 3 to come into the disengagement from the internal gear 3.

The rotary cam 5 is pushed by the restoring force of the lock spring 6 counterclockwise (in a direction of arrows R in FIG. 6) in a plan view from the X1 side. Consequently, the lock gear 4 is pressed radially outward (radially outward with respect to the internal gear 3) by the cam portion 52 of the rotary cam 5. In other words, the lock gear 4 is pushed by the lock spring 6 to the lock position.

Figure 7:
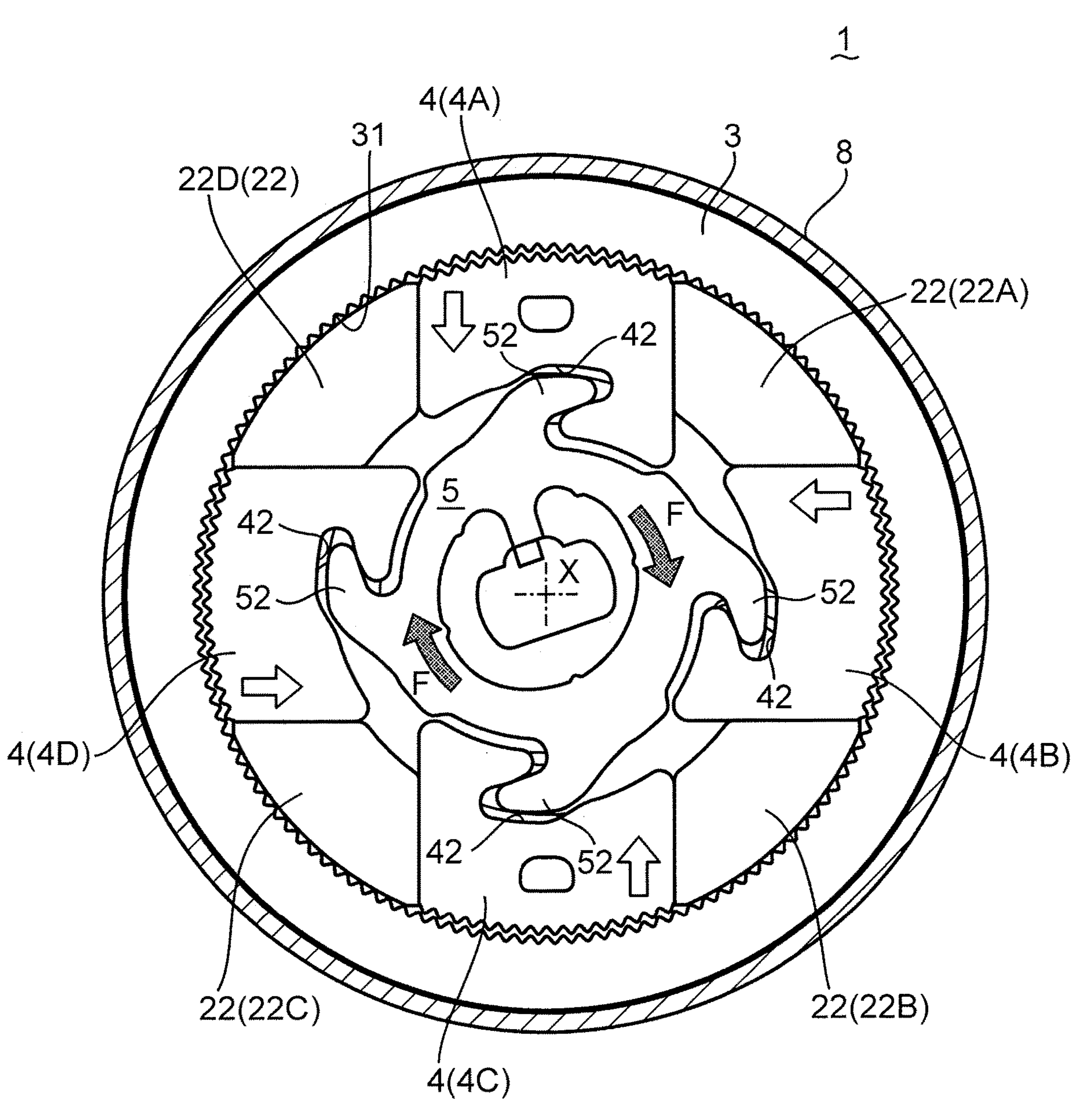
FIG. 7 is a partially sectional view of the reclining device (in an unlock state) from the X1 side.

As shown in FIG. 7, when a clockwise rotational force (clockwise in the plan view from the X1 side/in a direction of arrows F in FIG. 7) is applied to the rotary cam 5 against the force exerted by the lock spring 6, the cam portions 52 of the rotary cam 5 enter the cam notches 42 of the lock gears 4. The entering of the cam portions 52 withdraws the lock gears 4 radially inward (radially inward with respect to the internal gear 3) as shown in outlined arrows in FIG. 7. The lock gears 4 are thus shifted from the lock position to the unlock position.

When the lock gears 4 are set in the lock position, the lock gears 4 mesh with the internal gear 3. The relative rotation between the guide bracket 2 and the internal gear 3 is thus regulated. On the other hand, when the lock gears 4 are set in the unlock position, the interlocking between the lock gears 4 and the internal gear 3 is released. The relative shift between the guide bracket 2 and the internal gear 3 is thus allowed.

The rotary cam 5 is coupled with the plate piece 7 and is rotatable about a boss portion formed around a perimeter of the shaft hole 30 of the internal gear 3.

As shown in FIGS. 2 and 3, a plurality of positioning protrusions 32 protruding in the X1 direction is formed around the shaft hole 30 on the X1 side surface (the seatback frame (Sb) side) of the internal gear 3. A plurality of positioning protrusions 24 protruding in the X2 direction is formed around the opening 20 on the X2 side surface (the seat cushion frame (Sc) side) of the guide bracket 2. The reclining device 1 is arranged between the seatback frame (Sb) and the seat cushion frame (Sc) in a state where the protrusions 32 of the internal gear 3 are fitted in positioning holes formed in the seatback frame (Sb) and the protrusions 24 of the guide bracket 2 are fitted in positioning holes formed in the seat cushion frame (Sc), respectively.

The reclining device 1 arranged between the both frames (Sb, Sc) has the center through which the operation shaft (not shown) fixedly attached with the unillustrated operation lever is inserted. The operation shaft has a distal end having a rectangular cross section. This distal end is inserted in the shaft hole 51 of the rotary cam 5.

In a state where the operation lever is not operated, the lock gears 4 are held at the lock position by the restoring force of the lock spring 6. Specifically, the reclining device 1 is kept in the lock state (the state shown in FIG. 6) where the relative rotation between the guide bracket 2 and the internal gear 3 is regulated. The seatback is thus held at a predetermined tilt angle with respect to the seat cushion.

On the other hand, when the operation shaft is operated via the operation lever to rotate in the direction of the arrows F in FIG. 7, the lock gears 4 are withdrawn from the lock position to the unlock position. The reclining device 1 is thus in an unlock state where the relative rotation between the guide bracket 2 and the internal gear 3 is allowed. This makes it possible to change a tilt angle of the seatback with respect to the seat cushion. When the operation of the operation lever is terminated after the change of the angle of the seatback, the lock gears 4 return to the lock position (the reclining device 1 returns to the lock state) by the restoring force of the lock spring 6. The seatback is thus held at the changed tilt angle.

In the above-described reclining device 1, a small gap is secured between the guide parts 22 (side surfaces 22*a*) of the guide bracket 2 and the lock gears 4 (side surfaces 40*a*) in such a manner as to allow a smooth shift between the lock state and the unlock state, i.e., a sliding displacement (advancing and retracting movement) of each lock gear 4 between the lock position and the unlock position. In the conventional reclining devices, this gap was likely to make the seatback instable, consequently generating a contact noise (unusual noise) between the lock gears and the guide surface due to the instability. In view thereof, the above reclining device 1 adopts a configuration described below.

Specific Configuration of Reclining Device

Figure 8:
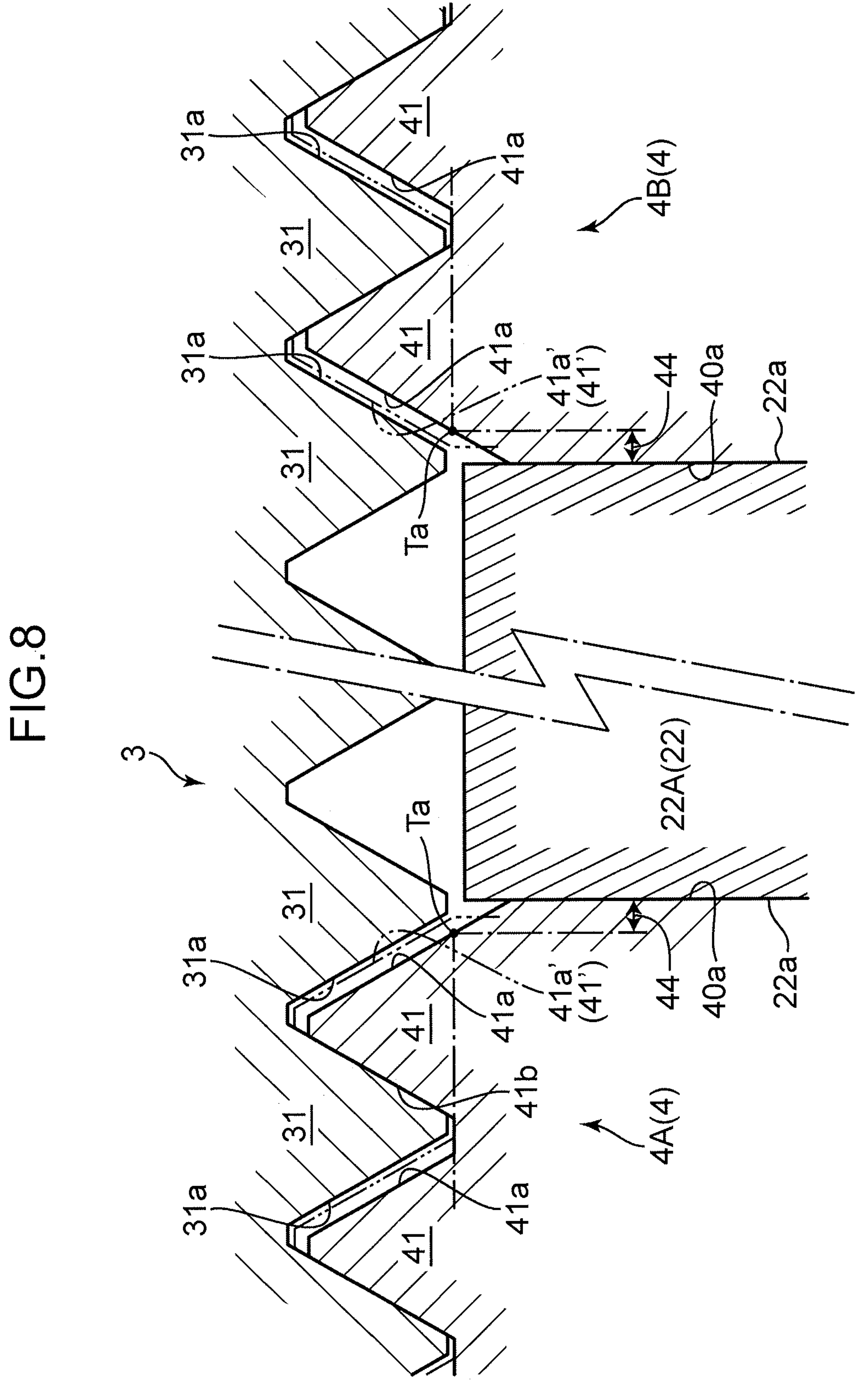
FIG. 8 is an enlarged schematic view of a part (enlarged schematic view of a region Ar1 in FIG. 6) of the reclining device showing a relationship among lock gears, an internal gear, and a guide part (guide bracket).

FIG. 8 is an enlarged schematic view of a part of the reclining device 1 showing a relationship among the lock gears 4, the internal gear 3, and the guide parts 22 (guide bracket 2). Specifically, FIG. 8 is a schematic diagram showing a region Ar1 indicated by a dashed and double dotted circle in FIG. 6, i.e., respective parts of the first guide part 22A and the first and second lock gears 4A, 4B provided on both sides of the first guide part 22A in a state where the lock gears 4 are in the lock position.

As shown in FIG. 8, in this reclining device 1, the external teeth 41 of the first lock gear 4A each have a shape including an indentation portion on the first guide part 22A side so as to define a gap between tooth surfaces 41*a* (referred to as a guide part side tooth surface 41*a*) closer to the first guide part 22A and tooth surfaces 31*a* of the internal teeth 31 opposing thereto in a tooth thickness direction (left-to-right direction in FIG. 8). Specifically, an external tooth having the same shape as an internal tooth 31 is a standard external tooth 41' (shown by an imaginary line in FIG. 8). The external tooth 41 has a shape formed by cutting out the first guide part 22A side of the standard external tooth 41' by a predetermined size in parallel to the guide part side tooth surface 41*a*'. Accordingly, the external tooth 41 has an appearance where a tooth depth thereof is smaller than a tooth depth of the internal tooth 31.

The external teeth 41 of the second lock gear 4B is the same. The external teeth 41 of the first lock gear 4A and the external teeth 41 of the second lock gear 4B each have a shape symmetrical (in a mirror-image relationship) with respect to the first guide part 22A.

Further, the first lock gear 4A has an end (referred to as abutting portion 44) on the first guide part 22A side that protrudes to the first guide part 22A from a tooth base position Ta of the external tooth 41 arranged closest to the first guide part 22A. An end surface of the abutting portion 44, i.e., the side surface 40*a* of the first lock gear 4A serves as a guided surface to be guided by the first guide part 22A (side surface 22*a*).

The second lock gear 4B is the same. The second lock gear 4B has an end on the first guide part 22A side that protrudes to the first guide part 22A from a tooth base position Ta of the external tooth 41 arranged closest to the first guide part 22A. An end surface (side surface 40*a*) of the abutting portion 44 serves as a guided surface to be guided by the first guide part 22A (side surface 22*a*).

Figure 9:
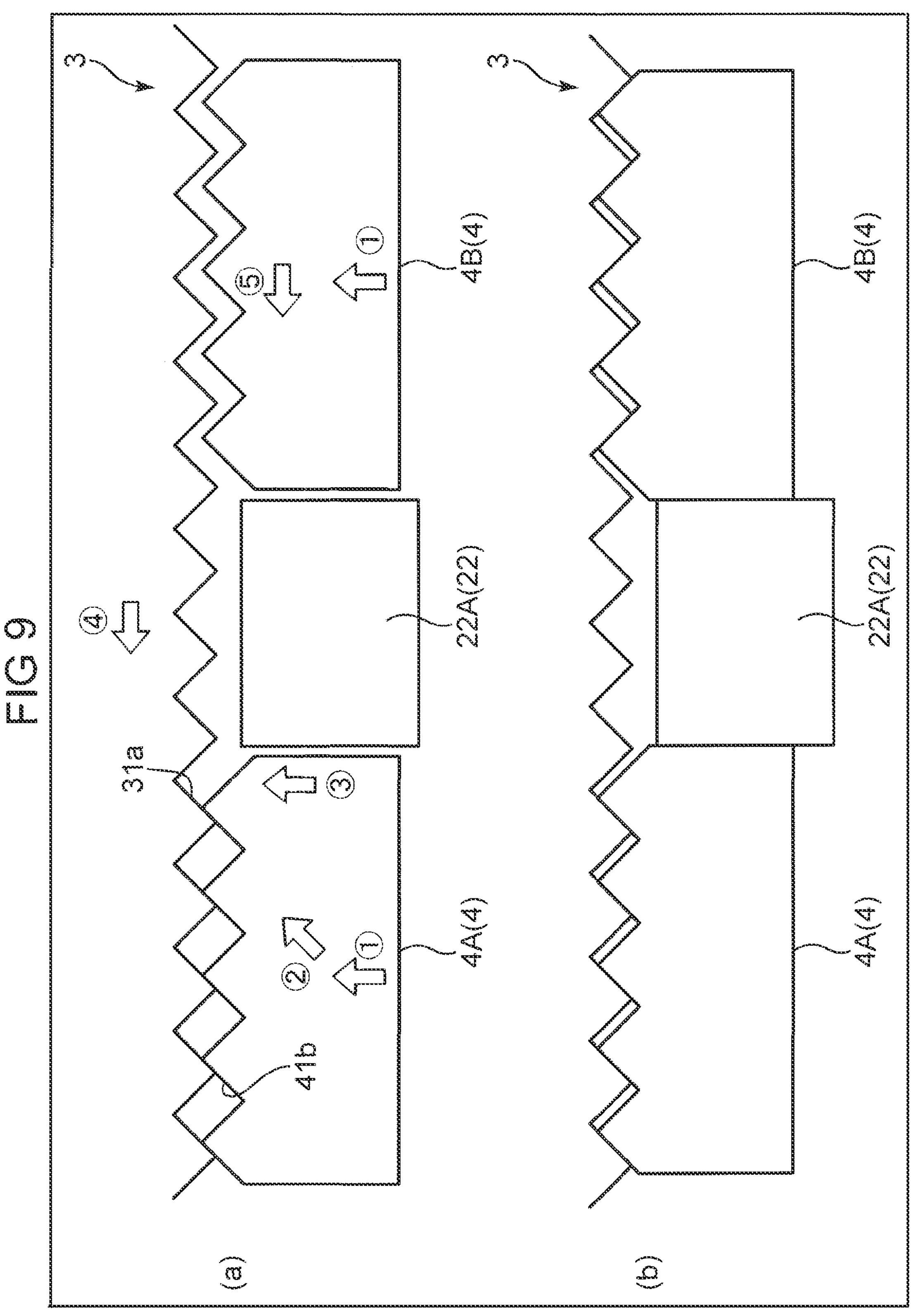
FIG. 9 shows an operational movement of the reclining device in schematic views, Section (a) is a schematic view of a part of the reclining device showing shift of lock gears from an unlock position to a lock position, and Section (b) is a schematic view of a part of the reclining device when the lock gears are in the lock position.

In this configuration, in the process where the reclining device 1 shifts from the unlock state to the lock state, as shown in FIGS. 9 (*a*) and 9 (*b*), the first and second lock gears 4A, 4B approach the first guide part 22A. When the reclining device 1 is in the lock state, the first and second lock gears 4A, 4B abut the first guide part 22A from both sides, i.e., the first and second lock gears 4A, 4B sandwich the first guide part 22A from the both sides.

More specifically, when the first and second lock gears 4A, 4B are shifted from the unlock position to the lock position [Arrows 1 in FIG. 9 (*a*)] by the restoring force of the lock spring 6, at a certain stage, for example, the external teeth 41 of the first lock gear 4A reach the internal teeth 31 of the internal gear 3, and non-guide part side tooth surfaces 41*b* of the external teeth 41 abut the tooth surfaces 31*a* of the internal teeth 31 opposing thereto. In contrast, since the external teeth 41 of the second lock gear 4B are each formed with an indentation portion on the first guide part 22A side as described above, the external teeth 41 do not come into contact with the internal teeth 31 at this stage as shown in the same drawing.

Subsequently, the first lock gear 4A, which has the non-guide part side tooth surfaces 41*b* abutting the internal teeth 31, moves obliquely and radially outward along the tooth surfaces 31*a* of the internal teeth 31 to thereby displace to the first guide part 22A, and abuts the first guide part 22A before reaching the lock position [Arrow 2 in FIG. 9 (*a*)]. On the other hand, the external teeth 41 of the second lock gear 4B do not come into contact with the internal teeth 31 even at this stage.

Since the first lock gear 4A is pressed by the restoring force of the lock spring 6, the first lock gear 4A further displaces to the lock position along the first guide part 22A. When the first lock gear 4A shifts to the lock position along the first guide part 22A [Arrow 3 in FIG. 9(*a*)], the internal gear 3 concurrently displaces counterclockwise relative to the guide bracket 2 [Arrow 4 in FIG. 9(*a*)]. This brings the tooth surfaces 31*a* of the internal teeth 31 in contact with the non-guide part side tooth surfaces 41*b* of the second lock gear 4B. The second lock gear 4B thus displaces to the first guide part 22A together with the internal gear 3 [Arrow 5 in FIG. 9(*a*)].

Consequently, when the reclining device 1 is shifted from the unlock state to the lock state, as shown in FIG. 9 (*b*), the first and second lock gears 4A, 4B abut the first guide part 22A, i.e., the first and second lock gears 4A, 4B sandwich the first guide part 22A from the both sides.

Figure 10:
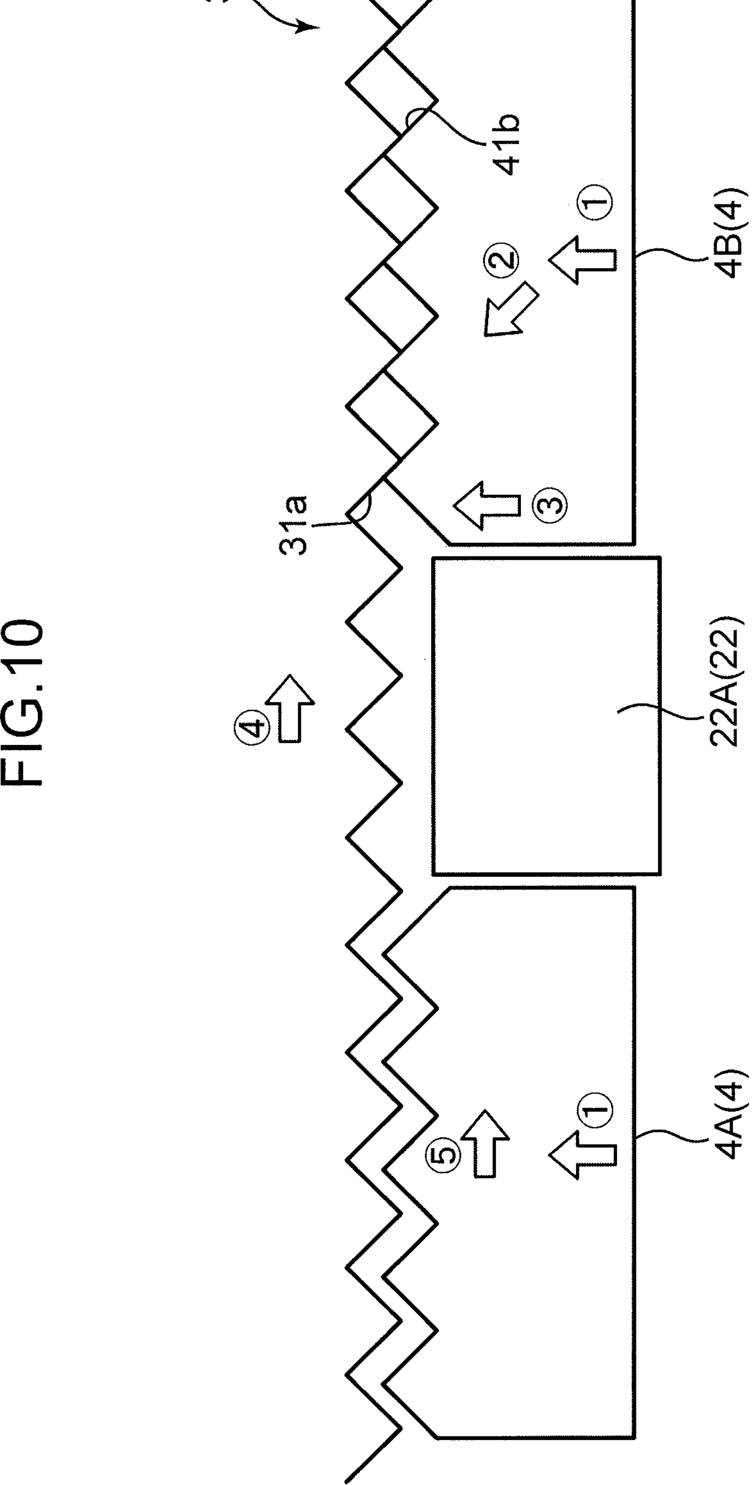
FIG. 10 is a schematic view of a part of the reclining device showing shift of the lock gears from the unlock position to the lock position.

FIGS. 9 (*a*) and 9(*b*) show the state where the external teeth 41 of the first lock gear 4A firstly meet (mesh with) the internal teeth 31 in the process in which the first and second lock gears 4A, 4B shift from the unlock position to the lock position. In the state where the external teeth 41 of the second lock gear 4B firstly meet the internal teeth 31, as shown in FIG. 10, excepting for the shift direction of the first and second lock gears 4A, 4B relative to the first guide part 22A and the moving direction of the internal gear 3 are opposite to those shown in FIG. 9(*a*), the state of these parts is the same as that shown in FIG. 9(*b*) when the first and second lock gears 4A, 4B are set in the lock position.

The phase (positional relationship) between the external teeth 41 and the internal teeth 31 changes according to a tilt angle of the seatback, i.e., relative position of the internal gear 3 and the lock gears 4 in the rotational direction. However, in the configuration where the first and second lock gears 4A, 4B each include external teeth 41 having an indentation portion on the first guide part 22A side, the non-guide part side tooth surfaces 41*b* of the external teeth 41 firstly come into contact with the tooth surfaces 31*a* of the internal teeth 31, but the guide part side tooth surfaces 41*a* do not firstly come into contact with the tooth surfaces 31*a* of the internal teeth 31 in any time in the process of the shift from the unlock position to the lock position. This is why the first and second lock gears 4A, 4B always move as shown in FIGS. 9(*a*) and 9(*b*) or in FIG. 10 and FIG. 9(*b*) irrespectively of the tilt angle of the seatback in the process of the shift from the unlock state to the lock state.

In the reclining device 1 described above, as stated above, the first and second lock gears 4A, 4B approach and abut the first guide part 22A arranged therebetween from the both sides in the process of the shift from the unlock state to the lock state, and this abutting state is maintained in the lock state. This reliably regulates the relative shift between the guide bracket 2 and the internal gear 3, and consequently, reliably prevents the instability of the seatback and the generation of a contact noise (unusual noise) between the lock gears 4 and the guide part 22 due to the instability.

Additionally, this advantageous effect can be provided by defining the indentation portion on the guide part 22 side of each external tooth 41 of the lock gear 4 as described above. This eliminates the need to provide additional wedge members or the like as conventionally required. Therefore, this reclining device 1 makes it possible to prevent the instability of a seatback and the generation of unusual noise without increasing the cost or the size.

In particular, in the reclining device 1, the first and second lock gears 4A, 4B include the abutting portions 44 on the respective ends on the first guide part 22A side. This facilitates the approach of the respective side surfaces 40*a* of the first and second lock gears 4A, 4B to the side surfaces 22*a* of the first guide part 22A. Consequently, the gap between the first, second lock gears 4A, 4B and the first guide part 22A can be more reliably closed.

The first embodiment shows a configuration including a pair of locking mechanisms (region Ar1 indicated by the dashed and double dotted circle in FIG. 6) that include the first guide part 22A and the pair of lock gears 4A, 4B arranged on the both sides thereof. However, the configuration is not limited to include only one pair of locking mechanisms. The configuration more preferably further includes another pair of locking mechanisms (region Ar2 indicated by a dashed and double dotted circle in FIG. 6) that includes a third guide part 22C and another pair of lock gears 4C, 4D arranged on the both sides thereof in order to increase the locking strength of the reclining device.

Reclining Device according to Second Embodiment

Next, a reclining device 1 according to a second embodiment will be described. The reclining device 1 of the second embodiment solves the following problem of the first embodiment. First, this problem will be described with reference to FIG. 13.

Figure 13:
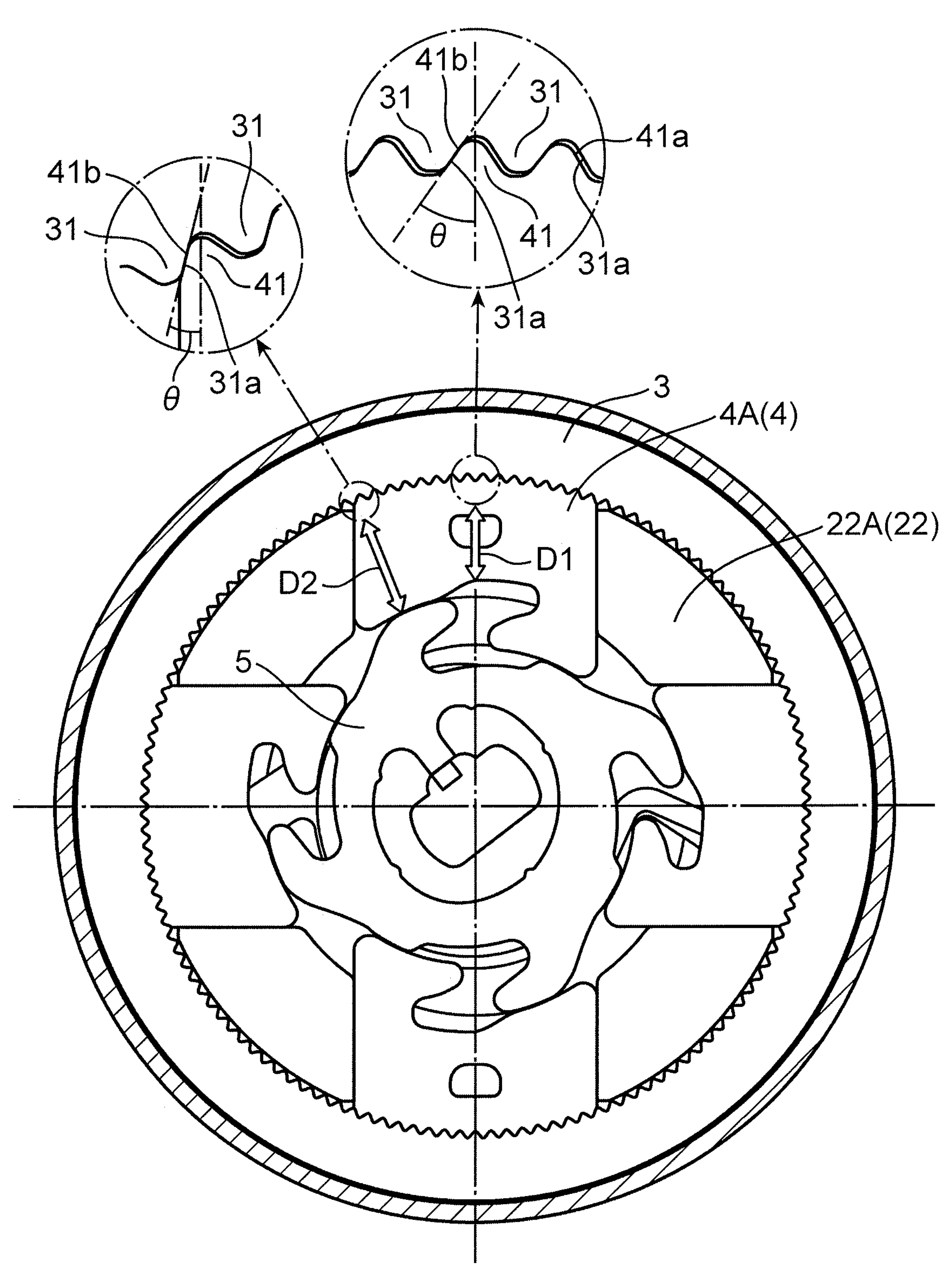
FIG. 13 is an enlarged view of parts of the reclining device shown in FIG. 6.

FIG. 13 is a partially enlarged view (partially enlarged view of FIG. 6) of parts of the first lock gear 4A and the internal gear 3 of the reclining device 1 of the first embodiment, and specifically, shows the reclining device 1 in the lock state.

In the lock state, the external teeth 41 of the first lock gear 4A mesh with the internal teeth 31 of the internal gear 3. In this state, as described above, the non-guide part side tooth surfaces 41*b* of the external teeth 41 abut the tooth surfaces 31*a* of the internal teeth 31, so that the gap exists between the guide part side tooth surfaces 41*a* of the external teeth 41 and the tooth surfaces 31*a* of the internal teeth 31 (see FIG. 8.)

The external teeth 41 are formed along the arc. Taking the note to the inclination angle θ of the non-guide part side tooth surfaces 41*b* of the external teeth 41 with respect to the sliding directions D1 of the first lock gear 4A, as shown in FIG. 13, the angle θ reaches its maximum at a middle in the width direction (the left-right direction in FIG. 13) of the first lock gear 4A, and decreases to the widthwise both ends, and then becomes substantially parallel to the sliding direction D1 in the both ends and in the vicinities thereof. Consequently, in the process of the shift from the lock state to the unlock state, the non-guide part side tooth surfaces 41*b* of the external teeth 41 are more liable to be caught by the internal teeth 31 in the widthwise both ends of the first lock gear 4A, which consequently requires an additional operation force to release the lock, and additionally generates an unusual noise to release the interlock between the internal teeth 31 and the external teeth 41. When the interlock in the ends becomes tighter due to dimensional variations in the machining, this tendency is liable to be even more remarkable.

In this case, it is conceivable to define an indentation portion on the non-guide part side tooth surface 41*b* of each external tooth 41 of the first lock gear 4A. However, the external teeth 41 are each defined with the indentation portion on the guide part side tooth surfaces 41*a* (see FIG. 8). Therefore, it will be seen that if the non-guide part side tooth surfaces 41*b* are each additionally defined with an indentation portion, the resulting external teeth 41 have too small tooth depths, and stable interlock can be hardly accomplished between the external teeth 41 and the internal teeth 31, i.e., the locking strength of the reclining device 1 can be hardly held.

In order to solve this problem, the reclining device 1 according to the second embodiment has the following configuration.

Figure 11:
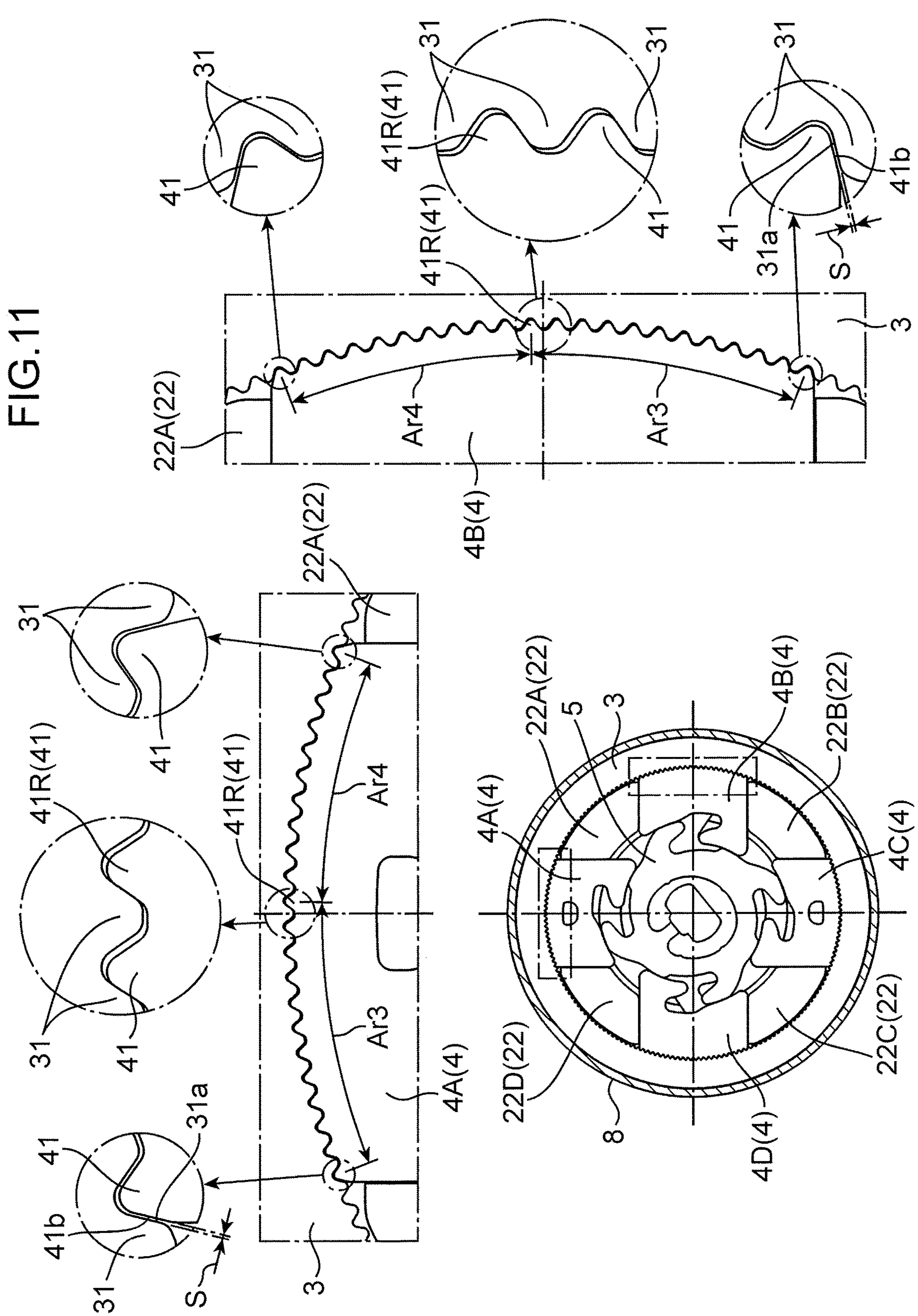
FIG. 11 is a sectional view of parts of a reclining device according to a second embodiment in a lock state, corresponding to FIG. 6.

FIG. 11 is a partially sectional view of the reclining device 1 of the second embodiment in the lock state that corresponds to FIG. 6. The reclining device 1 of the second embodiment has the configuration of a first lock gear 4A and a second lock gear 4B that is different from the first embodiment in the following features. A third guide part 22C and a third lock gear 4C and a fourth lock gear 4D arranged on both sides thereof have the same configuration as the first lock gear 4A and the second lock gear 4B. Other elements of the configuration are the same as the reclining device 1 according the first embodiment.

In the second embodiment, an external tooth 41 at a middle of the external teeth 41 of the first lock gear 4A in the running direction is a reference external tooth 41R. External teeth 41 in a guide part side region Ar4 with respect to the reference external tooth 41R have a different circular pitch from external teeth 41 in a non-guide part side region Ar3 with respect to the reference external tooth 41R.

Specifically, all the external teeth 41 in the non-guide part side region Ar3 are configured to have a circular pitch smaller than a circular pitch of the internal teeth 31 so that the external teeth 41 are closer to the reference external tooth 41R. On the other hand, all the external teeth 41 in the guide part side region Ar4 are configured to have a circular pitch larger than the circular pitch of the internal teeth 31 so that the external teeth 41 are away from the reference external tooth 41R. The second lock gear 4B is configured in the same manner as the first lock gear 4A. Although not graphically shown, the third and fourth lock gears 4C, 4D are also configured in the same manner as the first and second lock gears 4A, 4B.

In this case, the circular pitch of the external teeth 41 in the non-guide part side region Ar3 may be set to be constant (equal pitch), or to become gradually smaller in a direction from the reference external tooth 41R to the non-guide part side. Further, the circular pitch of the external teeth 41 in the guide part side region Ar4 may be set to be constant (equal pitch) or to become gradually larger in a direction from the reference external tooth 41R to the guide part. The second to fourth lock gears 4B to 4D may be the same.

In the reclining device 1 of the second embodiment, a gap S exists between the non-guide part side tooth surface 41*b* of the external tooth 41 and the tooth surface 31*a* of the internal tooth 31 in a non-guide part side end (left end in FIG. 11) of the first lock gear 4A and in the vicinity thereof when the reclining device 1 is in the lock state. In other words, the gap S can be defined even without forming the non-guide part side tooth surface 41*b* of each external tooth 41 of the first lock gear 4A into a shape having a cut-out portion. Therefore, the reclining device 1 of the second embodiment makes it possible to ensure a stable interlock between the external teeth 41 and the internal teeth 31 in the lock state, and reduce or prevent the phenomenon that an external tooth 41 is caught by an internal tooth 31 in the process of the shift from the lock state to the unlock state.

In this case, since the circular pitch is set to be larger in the guide part side region Ar4 as described above, the interference of the non-guide part side tooth surface 41*b* of the external tooth 41 with the internal tooth 31 can be avoided in the process of the shift from the lock state to the unlock state.

The above-description is made with reference to the first lock gear 4A. However, it will be seen that the second to fourth gears 4B to 4D proceed in the same way.

As described above, in this reclining device 1, the external tooth 41 at the middle of the external teeth 41 of the lock gear 4 (4A to 4D) in the arrangement direction is the reference external tooth 41R. However, the reference external tooth 41R is not limited to the external tooth 41 at the middle. In the case that the external tooth 41 at the middle is the reference external tooth 41R, it will be seen that the external teeth 41 in the non-guide part side region Ar3 and the external teeth 41 in the guide part side region Ar4 can mesh the internal teeth 31 in a balanced way and avoiding an interference between the external teeth 41 and the internal teeth 31. Therefore, in the configuration of the second embodiment, it is preferable to define an external tooth 41 at the middle of the external teeth 41 of the lock gear 4 or an external tooth 41 in the vicinity thereof in the running direction as the reference external tooth 41R.

Reclining Device According to Third Embodiment

Figure 12:
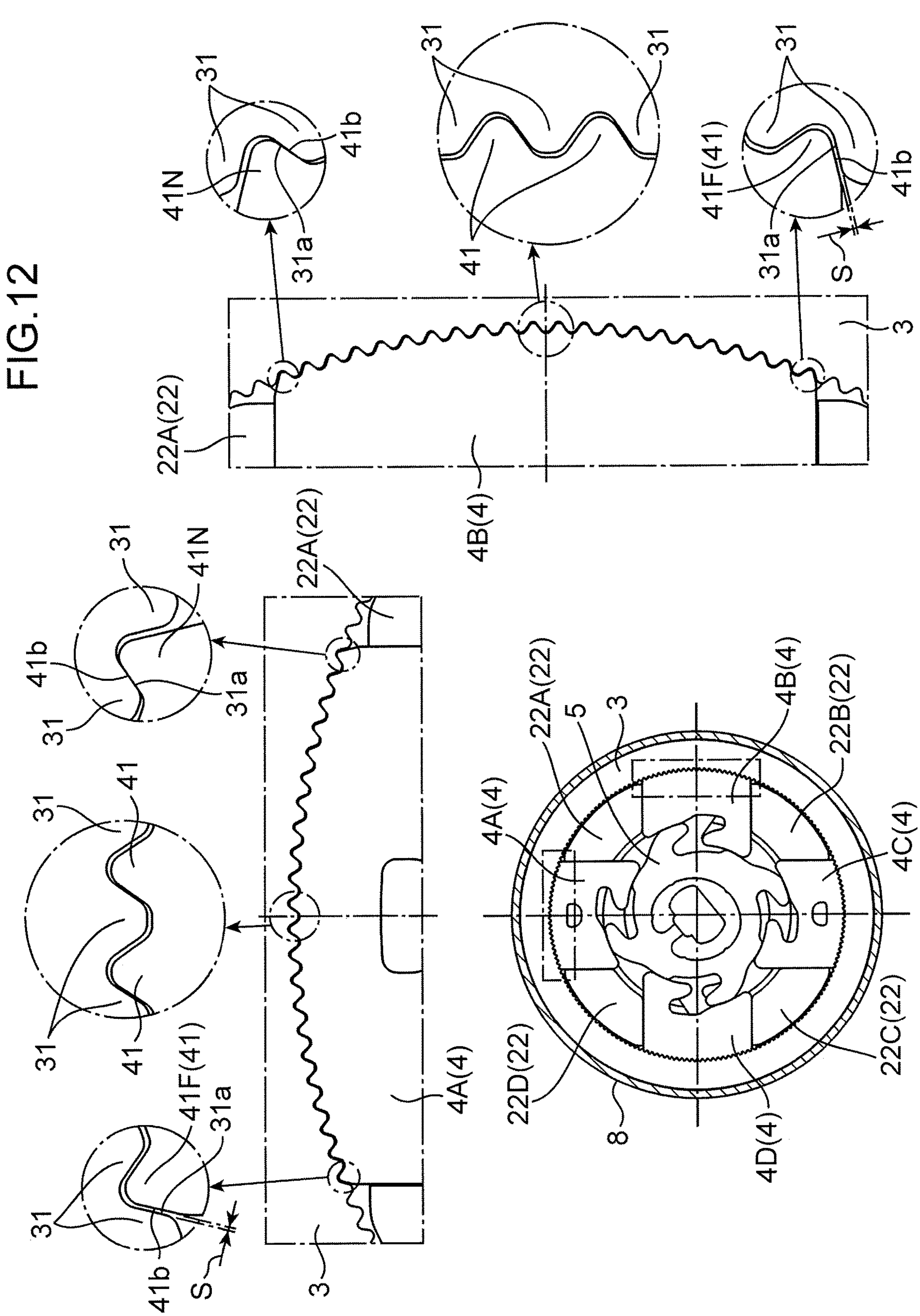
FIG. 12 is a sectional view of parts of a reclining device according to a third embodiment in a lock state, corresponding to FIG. 6.

FIG. 12 is a partially sectional view of a reclining device 1 according to a third embodiment, showing a lock state, corresponding to FIG. 6.

The reclining device 1 according to the third embodiment also solves the problem described in the first embodiment. The third embodiment also has the same basic structure of the reclining device 1 of the first embodiment excepting for that a configuration of a first lock gear 4A and a second lock gear 4B of the third embodiment is different from the first embodiment, and that third and fourth lock gears 4C, 4D arranged on both sides of a third guide part 22C have the same configuration of the first and second lock gear 4A and 4B. In the description below, the external tooth 41 closest to the first guide part 22A among the external teeth 41 of the first and second lock gears 4A, 4B is referred to as a first external tooth 41N, and the external tooth 41 farthest from the guide part is referred to as an n-th external tooth 41F.

In the third embodiment, the external teeth 41 of the first lock gear 4A have a constant circular pitch (equal pitch.) However, as shown in FIG. 12, the pitch is set such that the non-guide part side tooth surface 41*b* of the first external tooth 41N comes into contact with the tooth surface 31*a* of the internal tooth 31 opposing thereto, and a gap S exists between the non-guide part side tooth surface 41*b* of the n-th external tooth 41F and the tooth surface 31*a* of the internal tooth 31 when the reclining device 1 is in the lock state. The external teeth 41 of the second lock gear 4B is the same. Although not graphically shown, the third and fourth lock gears 4C, 4D are also configured in the same manner as the first and second lock gears 4A, 4B.

In the configuration of the reclining device 1 of the third embodiment, when the reclining device 1 is in the lock state, the gap S exists between the non-guide part side tooth surface 41*b* of the n-th external tooth 41F and an external tooth 41 in the vicinity thereof and the tooth surfaces 31*a* of the internal teeth 31. In other words, the gap S can be defined without forming the non-guide part side tooth surface 41*b* of the external tooth 41 of the first lock gear 4A into a shape having a cut-out portion. Therefore, in the same manner as the second embodiment, the reclining device 1 of the third embodiment also makes it possible to ensure a stable interlock between the external teeth 41 and the internal teeth 31 in the lock state, and reduce or prevent the phenomenon that an external tooth 41 is caught by an internal tooth 31 in the process of the shift from the lock state to the unlock state.

The above-description is made with reference to the first lock gear 4A. However, the second to fourth lock gears 4B to 4D proceed in the same way.

Modifications

The reclining devices 1 described above show preferred embodiments of a reclining device according to the present invention. Their specific configurations may be properly modified within the scope of the gist of the invention. For example, the following configurations may be adopted.

(1) The external teeth 41 of the first and second lock gears 4A, 4B in the embodiments each have a shape formed by cutting out the first guide part 22A side of the standard external tooth 41' (imaginary line in FIG. 8) by a predetermined size in parallel to the guide part side tooth surface 41*a*'. However, the external tooth 41 is not limited to this specific shape. In short, it is sufficient that the external tooth 41 has a shape which allows a gap to be defined between the guide part side tooth surface 41*a* and the tooth surface 31*a* of the internal tooth 31 in the lock state.

Additionally, the shape of the external teeth 41 of the first and second lock gears 4A, 4B arranged on the both sides of the first guide part 22A are not necessary to be symmetrical (in the mirror-image relationship) with respect to the guide part 22, but the shape may be properly modified. However, it is noted that the symmetrical shape can reduce the operational difference (variation) between the pair of lock gears 4 arranged on the both sides of the guide part 22 to thereby contribute to a smooth shift between the lock state and the unlock state, and advantageously give the uniform durability to the first and second lock gears 4A and 4B by ensuring equalized tooth surface strength to the external teeth 41 of the first and second lock gears 4A and 4B.

(2) The reclining device 1 of the first embodiment adopts the configuration (configuration shown in FIG. 8) of the present invention (i.e., adopts the pair of locking mechanisms) with respect to the first guide part 22A and the first lock gear 4A and the second lock gear 4B arranged on both sides thereof. However, the present invention is not limited to this configuration, and may further adopt the same configuration (may adopt the second pair of locking mechanisms) with respect to the region Ar2 indicated by the dashed and double dotted circle in FIG. 6, i.e., to the third guide part 22C and the third lock gear 4C and the fourth lock gear 4D arranged on the both sides thereof.

This configuration makes it possible to more reliably prevent the instability of the seatback and the generation of the contact noise (unusual noise) between the lock gears 4 and the guide part 22 due to the instability when the reclining device 1 is in the lock state.

(3) In the embodiments, the description is made about the reclining device 1 including four lock gears 4. However, the present invention may be applied to a reclining device including three lock gears 4. In this case, two lock gears 4 arranged on the both sides of one guide part 22 may have the configuration (configuration shown in FIG. 8), and the remaining lock gear 4 may include external teeth 41 of the lock gear 4 having the same shape as the shape of the internal teeth 31. The present invention may also be applied to a reclining device including five or more lock gears 4.

(4) In the embodiments, the description is made about the reclining device 1 for use in a seat for an automobile. However, the present invention is not limited to a reclining device for use in a seat for an automobile, but may be also applied to various seats for a vehicle such as a train, an aircraft, a vessel other than an automobile, and for office, household, and the like.

The present invention described above is summarized hereinafter.

The present invention has been worked out in view of the circumstances. A reclining device according to an aspect of the present invention includes a guide bracket that is fixedly attached to one of a seat cushion and a seatback, an internal gear that is fixedly attached to the other of the seat cushion and the seatback and is shiftable for relative rotation to the guide bracket, at least a pair of lock gears that are respectively arranged on both sides of a guide part provided on the guide bracket and movable along the guide part, each lock gear including external teeth meshable with internal teeth of the internal gear, and a cam that shifts the lock gears along the guide part between a lock position at which the internal teeth are meshed with the external teeth to regulate relative rotation and an unlock position to release lock. Further, the external teeth of the pair of lock gears each have a shape including an indentation portion on a tooth surface closer to the guide part in a tooth thickness direction so as to define a gap between the tooth surface closer to the guide part and an internal tooth of the internal gear when the lock gears are in the lock position.

In this configuration of the reclining device, when the lock gears shift from the unlock position to the lock position, the pair of lock gears respectively approach the guide part provided therebetween, and when the lock gears are finally set in the lock position, the gap between the pair of lock gears and the guide part provided therebetween can be closed. Therefore, the relative rotation between the internal gear and the guide bracket can be more strictly prevented in the state where the lock gears are set in the lock position. Consequently, the instability of the seatback and the generation of a contact noise (unusual noise) between the lock gears and the guide part due to the instability can be prevented. Additionally, this advantageous effect can be achieved by the above-described ingenious design of the shape of the external teeth of the lock gears. This eliminates the need to provide additional wedge members or the like as conventionally required.

Therefore, this configuration of the reclining device makes it possible to prevent the instability of the seatback and the generation of unusual noise without increasing the cost or the size.

In the locking mechanism of the lock gear, when one of the pair of lock gears is a first lock gear and the other is a second lock gear, a shape of external teeth of the first lock gear and a shape of external teeth of the second lock gear may be preferably symmetrical with respect to the guide part.

In this configuration, the operational difference between the pair of lock gears arranged on both sides of the guide part can be reduced, and further, the same strength can be secured for the pair of lock gears, consequently equalizing their durability.

In the above reclining device, the external teeth closest to the guide part among the external teeth of the pair of lock gears each may preferably include a part protruding from the root to the guide part.

In this configuration, the gap between the pair of lock gears and the guide part provided therebetween can be more reliably closed.

Although the above configuration refers to the reclining device including the pair of locking mechanisms that include one guide part and a pair of lock gears arranged on both sides thereof, the present invention is not limited to this configuration. The reclining device according to the present invention may have a configuration including two pairs of the lock gears, i.e., four lock gears in total, and the four lock gears may be arranged at equal intervals in a circumferential direction of the internal gear.

This configuration makes it possible to more strictly regulate the relative rotation between the internal gear and the guide bracket in the state where the lock gears are set in the lock position compared with a configuration including only one pair of locking mechanisms. Therefore, the instability of the seatback and the generation of the contact noise (unusual noise) between the lock gears and the guide part due to the instability can be more reliably prevented.

The reclining device may have a configuration including three lock gears in total including the pair of lock gears, where the three lock gears are arranged at equal intervals in the circumferential direction of the internal gear.

In the reclining device of the present invention, the internal gear may include the cylinder formed with the internal teeth in the inner circumferential surface thereof, the pair of lock gears each are arranged in the inside of the internal gear movably in the radial direction of the internal gear, and the external teeth are arranged along the arc so as to mesh with internal teeth in the section of the internal gear, and when an external tooth which is one of external teeth of the lock gear excluding the opposite end external teeth is a reference external tooth, it may be appreciated that external teeth in a region farther away from the guide part than the reference external tooth have a circular pitch smaller than a circular pitch of the internal teeth so that the external teeth are closer to the reference tooth, and external teeth in a region closer to the guide part than the reference external tooth have a circular pitch larger than the circular pitch of the internal teeth so that the external teeth are away from the reference tooth.

In this configuration, in the end on the non-guide part side of the lock gear and in the vicinity thereof, when the lock gears are shifted in the lock position, a gap is formed between the non-guide part side tooth surface of the external teeth and the internal teeth. Therefore, it possible to reduce or prevent the phenomenon that an external tooth is caught by an internal tooth in the end on the non-guide part side and in the vicinity thereof when the lock gears are shifted from the lock state to the unlock state without forming an indentation portion on the non-guide part side tooth surfaces of the external teeth of the lock gear.

In this configuration, the reference external tooth may be an external tooth at a middle of the external teeth of the lock gear in the arrangement direction or an external tooth in a vicinity of the middle.

In this configuration, the external teeth in the non-guide part side region and the external teeth in the guide part side region can mesh the internal teeth in a balanced way and avoiding an interference between the external teeth and the internal teeth.

In the reclining device, the internal gear may include the cylinder formed with the internal teeth in the inner circumferential surface thereof, the pair of lock gears each are provided in the inside of the internal gear movably in the radial direction of the internal gear, and the external teeth are arranged along the arc so as to mesh with internal teeth in the section of the internal gear, and when, among the external teeth of each of the pair of lock gears, the external tooth closest to the guide part is a first external tooth and the external tooth farthest from the guide part is an n-th external tooth, it may be appreciated that the external teeth of the lock gear are arranged at a constant pitch, and the pitch is set such that the first external tooth has a tooth surface away from the guide part and coming into contact with a tooth surface of an internal tooth, and the n-th external tooth has a tooth surface away from the guide part and defining a gap against a tooth surface of an internal tooth when the lock gear is in the lock position.

In this configuration, in the end on the non-guide part side of the lock gear and in the vicinity thereof, when the lock gears are shifted in the lock position, a gap is formed between the non-guide part side tooth surface of the external teeth and the internal teeth. Therefore, it is possible to reduce or prevent the phenomenon that an external tooth is caught by an internal tooth in the non-guide part side end and in the vicinity thereof when the lock gears are shifted from the lock state to the unlock state without forming an indentation portion on the non-guide part side tooth surfaces of the external teeth of the lock gear.

The invention claimed is:

1. A reclining device, comprising:

a guide bracket that is fixedly attached to one of a seat cushion and a seatback;

an internal gear that is fixedly attached to the other of the seat cushion and the seatback and is shiftable for relative rotation to the guide bracket;

at least a pair of lock gears that are respectively arranged on both sides of a guide part provided on the guide bracket and movable along the guide part, each lock gear including external teeth meshable with internal teeth of the internal gear; and a cam that shifts the lock gears along the guide part between a lock position at which the internal teeth are meshed with the external teeth to regulate relative rotation and an unlock position at which the meshing between the internal teeth and the external teeth is released to allow the relative rotation, wherein all the external teeth of each of the pair of lock gears each have a shape including an indentation portion on a tooth surface closer to the guide part in a tooth thickness direction so as to define a gap between the tooth surface closer to the guide part and an internal tooth of the internal gear when the lock gears are in the lock position, the shape of the external teeth allowing the pair of lock gears to sandwich the guide part from the both sides when the pair of lock gears are in the lock position.

2. The reclining device according to claim 1, wherein one of the pair of lock gears is a first lock gear and the other is a second lock gear, a shape of external teeth of the first lock gear and a shape of external teeth of the second lock gear are symmetrical with respect to the guide part.

3. The reclining device according to claim 1, wherein at least one of the pair of lock gears includes a part abutting from the root of an external tooth closest to the guide part to the guide part.

4. The reclining device according to claim 1, comprising: two pairs of the lock gears, wherein the four lock gears in total are arranged at equal intervals in a circumferential direction of the internal gear.

5. The reclining device according to claim 1, comprising: three lock gears in total including the pair of lock gears, wherein the three lock gears are arranged at equal intervals in a circumferential direction of the internal gear.

6. The reclining device according to claim 1, wherein the internal gear includes a cylinder formed with the internal teeth in an inner circumferential surface thereof, the pair of lock gears each are arranged in an inside of the internal gear movably in a radial direction of the internal gear, and the external teeth are arranged along an arc so as to mesh with internal teeth in a section of the internal gear, and an external tooth which is one of external teeth of the lock gear excluding the opposite end external teeth is a reference external tooth, external teeth in a region farther away from the guide part than the reference external tooth have a circular pitch smaller than a circular pitch of the internal teeth so that the external teeth are closer to the reference tooth, and external teeth in a region closer to the guide part than the reference external tooth have a circular pitch larger than the circular pitch of the internal teeth so that the external teeth are away from the reference tooth.

7. The reclining device according to claim 6, wherein the reference external tooth is an external tooth at a middle of the external teeth of the lock gear in an arrangement direction or an external tooth in a vicinity of the middle.

8. The reclining device according to claim 1, wherein the internal gear includes a cylinder formed with the internal teeth in an inner circumferential surface thereof, the pair of lock gears each are arranged in an inside of the internal gear movably in a radial direction of the internal gear, and the external teeth are arranged along an arc so as to mesh with internal teeth in a section of the internal gear, and among the external teeth of each of the pair of lock gears, the external tooth closest to the guide part is a first external tooth and the external tooth farthest from the guide part is an n-th external tooth, the external teeth of the lock gear are arranged at a constant pitch, and the pitch is set such that the first external tooth has a tooth surface away from the guide part and coming into contact with a tooth surface of an internal tooth, and the n-th external tooth has a tooth surface away from the guide part and defining a gap against a tooth surface of an internal tooth when the lock gear is in the lock position.

9. A reclining device, comprising:

a guide bracket that is fixedly attached to one of a seat cushion and a seatback;

an internal gear that is fixedly attached to the other of the seat cushion and the seatback and is shiftable for relative rotation to the guide bracket;

at least a pair of lock gears that are respectively arranged on both sides of a guide part provided on the guide bracket and movable along the guide part, each lock gear including external teeth meshable with internal teeth of the internal gear; and a cam that shifts the lock gears along the guide part between a lock position at which the internal teeth are meshed with the external teeth to regulate relative rotation and an unlock position at which the meshing between the internal teeth and the external teeth is released to allow the relative rotation, wherein the external teeth of the pair of lock gears each have a shape including an indentation portion on a tooth surface closer to the guide part in a tooth thickness direction so as to define a gap between the tooth surface closer to the guide part and an internal tooth of the internal gear when the lock gears are in the lock position, the internal gear includes a cylinder formed with the internal teeth in an inner circumferential surface thereof, the pair of lock gears each are arranged in an inside of the internal gear movably in a radial direction of the internal gear, and the external teeth are arranged along an arc so as to mesh with internal teeth in a section of the internal gear, and an external tooth which is one of external teeth of the lock gear excluding the opposite end external teeth is a reference external tooth, external teeth in a region farther away from the guide part than the reference external tooth have a circular pitch smaller than a circular pitch of the internal teeth so that the external teeth are closer to the reference tooth, and external teeth in a region closer to the guide part than the reference external tooth have a circular pitch larger than the circular pitch of the internal teeth so that the external teeth are away from the reference tooth.

10. The reclining device according to claim 9, wherein the reference external tooth is an external tooth at a middle of the external teeth of the lock gear in an arrangement direction or an external tooth in a vicinity of the middle.

11. A reclining device, comprising:

a guide bracket that is fixedly attached to one of a seat cushion and a seatback;

an internal gear that is fixedly attached to the other of the seat cushion and the seatback and is shiftable for relative rotation to the guide bracket;

at least a pair of lock gears that are respectively arranged on both sides of a guide part provided on the guide bracket and movable along the guide part, each lock gear including external teeth meshable with internal teeth of the internal gear; and a cam that shifts the lock gears along the guide part between a lock position at which the internal teeth are meshed with the external teeth to regulate relative rotation and an unlock position at which the meshing between the internal teeth and the external teeth is released to allow the relative rotation, wherein the external teeth of the pair of lock gears each have a shape including an indentation portion on a tooth surface closer to the guide part in a tooth thickness direction so as to define a gap between the tooth surface closer to the guide part and an internal tooth of the internal gear when the lock gears are in the lock position, the internal gear includes a cylinder formed with the internal teeth in an inner circumferential surface thereof, the pair of lock gears each are arranged in an inside of the internal gear movably in a radial direction of the internal gear, and the external teeth are arranged along an arc so as to mesh with internal teeth in a section of the internal gear, and among the external teeth of each of the pair of lock gears, the external tooth closest to the guide part is a first external tooth and the external tooth farthest from the guide part is an n-th external tooth, the external teeth of the lock gear are arranged at a constant pitch, and the pitch is set such that the first external tooth has a tooth surface away from the guide part and coming into contact with a tooth surface of an internal tooth, and the n-th external tooth has a tooth surface away from the guide part and defining a gap against a tooth surface of an internal tooth when the lock gear is in the lock position.

* * * * *